(12) United States Patent
Kim et al.

(10) Patent No.: US 12,507,361 B2
(45) Date of Patent: Dec. 23, 2025

(54) FOLDABLE ELECTRONIC DEVICE INCLUDING FLEXIBLE DISPLAY WITH A CURVED REGION

(71) Applicant: SAMSUNG ELECTRONICS CO., LTD., Gyeonggi-do (KR)

(72) Inventors: Yongyoun Kim, Gyeonggi-do (KR);
Gyusub Kim, Gyeonggi-do (KR);
Namsu Kim, Gyeonggi-do (KR);
Sungsoo Kim, Gyeonggi-do (KR);
Hyunho Shin, Gyeonggi-do (KR);
Jungchul An, Gyeonggi-do (KR);
Taekyung Lee, Gyeonggi-do (KR);
Hyungjoo Lee, Gyeonggi-do (KR);
Bonggyo Seo, Gyeonggi-do (KR);
Sanggon Shin, Gyeonggi-do (KR);
Oleg Feygenson, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 276 days.

(21) Appl. No.: 18/298,992

(22) Filed: Apr. 11, 2023

(65) Prior Publication Data

US 2023/0363098 A1 Nov. 9, 2023

Related U.S. Application Data

(63) Continuation of application No. PCT/KR2021/015771, filed on Nov. 3, 2021.

(30) Foreign Application Priority Data

Nov. 18, 2020 (KR) ........................ 10-2020-0154355

(51) Int. Cl.
*H05K 5/02* (2006.01)
*H05K 5/03* (2006.01)

(52) U.S. Cl.
CPC .............. *H05K 5/0226* (2013.01); *H05K 5/03* (2013.01)

(58) Field of Classification Search
CPC ............... G02B 5/30; G06F 2200/1635; G06F 2203/04102; G06F 1/1652; G06F 1/1656;
(Continued)

(56) References Cited

U.S. PATENT DOCUMENTS 8,736,162 B2 5/2014 Jin et al.
9,173,288 B1 * 10/2015 Kim ..................... G06F 1/1681
(Continued)

FOREIGN PATENT DOCUMENTS

CN 111605282 A 9/2020
KR 20130004085 A 1/2013
(Continued)

OTHER PUBLICATIONS

International Search Report and Written Opinion for International Application No. PCT/KR2021/015771; Date of Search: Feb. 24, 2022; with English Translation of Search; 4 pages.
(Continued)

*Primary Examiner* — Allen L Parker
*Assistant Examiner* — Dakota M Talbert
(74) *Attorney, Agent, or Firm* — CANTOR COLBURN LLP (57) ABSTRACT

An electronic device may include a first housing, a second housing, and a hinge housing arranged between the first housing and the second housing. A display includes a first area, which extends from the first housing to the second housing across the hinge housing and corresponds to the first housing, a second area corresponding to the second housing, and a folding area corresponding to the hinge housing. A first decorating member is arranged on an edge oriented in a direction opposite to that of an edge adjacent to the folding
(Continued)

area from among edges of the first area and a second decorating member is arranged on an edge oriented in a direction opposite to that of an edge adjacent to the folding area from among the edges of the second area.

20 Claims, 8 Drawing Sheets

(58) Field of Classification Search
CPC ... G06F 1/1637; G06F 1/1681; H05K 5/0226; H05K 5/03
See application file for complete search history.

(56) References Cited

U.S. PATENT DOCUMENTS

| | | | |
|---|---|---|---|
| 9,326,375 B2 | 4/2016 | Lee | |
| 9,448,592 B2 | 9/2016 | Jin et al. | |
| 9,454,179 B2* | 9/2016 | Shin | G06F 1/1637 |
| 9,480,174 B2 | 10/2016 | Park | |
| 9,513,668 B2 | 12/2016 | Shin et al. | |
| 9,572,267 B2 | 2/2017 | Cho | |
| 9,578,149 B2 | 2/2017 | Moon et al. | |
| 9,578,759 B2 | 2/2017 | Seo et al. | |
| 9,786,207 B2 | 10/2017 | Kim et al. | |
| 9,798,359 B2 | 10/2017 | Seo et al. | |
| 9,832,638 B2 | 11/2017 | Cha et al. | |
| 9,942,978 B2 | 4/2018 | Lee | |
| 9,989,995 B2 | 6/2018 | Kwak et al. | |
| 9,996,201 B2 | 6/2018 | Kim et al. | |
| 10,019,032 B2 | 7/2018 | Shin et al. | |
| 10,032,391 B2 | 7/2018 | Kim et al. | |
| 10,061,356 B2 | 8/2018 | Jin et al. | |
| 10,120,415 B2 | 11/2018 | Seo et al. | |
| 10,162,386 B2 | 12/2018 | Chong et al. | |
| 10,416,711 B2 | 9/2019 | Shin et al. | |
| 10,496,133 B2 | 12/2019 | Jin et al. | |
| 10,499,493 B2 | 12/2019 | Lee | |
| 10,520,984 B2 | 12/2019 | Ma | |
| 10,901,464 B2 | 1/2021 | Seo et al. | |
| 11,016,527 B2 | 5/2021 | Park et al. | |
| 11,069,265 B2 | 7/2021 | Jung et al. | |
| 11,169,570 B2 | 11/2021 | Jin et al. | |
| 11,340,654 B2 | 5/2022 | Kwak et al. | |
| 11,402,875 B2 | 8/2022 | Cho et al. | |
| 11,444,260 B2 | 9/2022 | Choi et al. | |
| 11,839,099 B2 | 12/2023 | Choi et al. | |
| 2014/0104762 A1 | 4/2014 | Park | |
| 2015/0212626 A1 | 7/2015 | Kim et al. | |
| 2016/0226015 A1 | 8/2016 | Kauhaniemi et al. | |
| 2017/0061836 A1 | 3/2017 | Kim et al. | |
| 2017/0365197 A1 | 12/2017 | Kim et al. | |
| 2018/0070460 A1 | 3/2018 | Han | |
| 2018/0260055 A1 | 9/2018 | Kim et al. | |
| 2019/0278332 A1 | 9/2019 | Ma | |
| 2019/0339739 A1 | 11/2019 | Park et al. | |
| 2019/0369671 A1 | 12/2019 | Seo et al. | |
| 2020/0051468 A1 | 2/2020 | Jung et al. | |
| 2020/0092408 A1 | 3/2020 | Moon et al. | |
| 2020/0192431 A1* | 6/2020 | Shin | G06F 1/1626 |
| 2020/0266384 A1 | 8/2020 | Choi et al. | |
| 2020/0287275 A1 | 9/2020 | Son et al. | |
| 2020/0333849 A1 | 10/2020 | Cho et al. | |
| 2021/0096598 A1 | 4/2021 | Lim | |
| 2021/0141422 A1 | 5/2021 | Seo et al. | |
| 2021/0240228 A1 | 8/2021 | Jin et al. | |
| 2021/0343195 A1 | 11/2021 | Jung et al. | |
| 2021/0380474 A1* | 12/2021 | Brandenburg | C03C 17/32 |
| 2021/0385645 A1 | 12/2021 | Cha et al. | |
| 2022/0066507 A1 | 3/2022 | Jin et al. | |
| 2023/0006171 A1 | 1/2023 | Choi et al. | |
| 2024/0099049 A1 | 3/2024 | Choi et al. | |

FOREIGN PATENT DOCUMENTS

| | | |
|---|---|---|
| KR | 20130007311 A | 1/2013 |
| KR | 20140122597 A | 10/2014 |
| KR | 20150042123 A | 4/2015 |
| KR | 101529933 B1 | 6/2015 |
| KR | 20160097106 A | 8/2016 |
| KR | 20160121031 A | 10/2016 |
| KR | 20160124414 A | 10/2016 |
| KR | 20170005281 A | 1/2017 |
| KR | 20170026023 A | 3/2017 |
| KR | 20190064552 A | 6/2019 |
| KR | 20190127074 A | 11/2019 |
| KR | 102075846 B1 | 2/2020 |
| KR | 20200018282 A | 2/2020 |
| KR | 20200100385 A | 8/2020 |
| KR | 20200123627 A | 10/2020 |

OTHER PUBLICATIONS

Extended European Search Report dated Feb. 8, 2024, issued for the corresponding the European application 21894960.0-1224 / 4220338 PCT/KR1015771.

Korean Office Action; Application No. 10-2020-0154355 filed Nov. 18, 2020; mailed Mar. 17, 2025; 16 pages; English Translation.

* cited by examiner

FOLDABLE ELECTRONIC DEVICE INCLUDING FLEXIBLE DISPLAY WITH A CURVED REGION

TECHNICAL FIELD

Embodiments of the disclosure relate to a foldable electronic device including a flexible display.

BACKGROUND ART

A portable electronic device, such as a smartphone, may provide various functions, such as, and without limitation, telephonic conversations, moving picture reproduction, and searching on the Internet, based on various types of applications. A user may want to use the above-described various functions through a wider screen. However, as a screen is expanded, the portability of the electronic device may be lowered. Accordingly, there has been a foldable electronic device employing a flexible display and a folding structure to enlarge the screen of the electronic device and to increase the portability thereof.

DISCLOSURE

Technical Problem

A foldable electronic device may be disposed such that a hinge structure is connected to adjacent housings, and rotates while supporting the housings while the housings rotate at a specific angle. In addition, regarding a hinge operation of the housings, the display may have a folded state or a flat state. In the folded state, a plurality of layers constituting the display make a length difference at an edge of the display. Accordingly, a gap having a specific size may be required between the display and the housings. Such a gap may allow for foreign substances to enter the gap. The foldable electronic device may include a decorating member (or a decorating component) interposed between the display and the housings to reduce the introduction of foreign substances into the gap.

Technical Solution

Various embodiments of the disclosure are configured to provide an electronic device including a curved region formed at a partial edge of a display except for a folding region of the display, thereby reducing the introduction of foreign substances.

According to an embodiment of the disclosure, an electronic device may include a first housing, a second housing, a hinge housing interposed between the first housing and the second housing, a display extending from the first housing to the second housing and crossing the hinge housing, and including a first region corresponding to the first housing, a second region corresponding to the second housing, and a folding region corresponding to the hinge housing, a first decorating member disposed at an edge of edges of the first region, which is opposite to an edge adjacent to the folding region, and a second decorating member disposed at an edge of edges of the second region, which is opposite to an edge adjacent to the folding region. The first housing and the second housing may be configured to perform a folding operation or an unfolding operation about a folding axis, and form a flat state in which the first region, the folding region, and the second region are aligned in line with each other and/or define a plane, or a folded state in which the first region faces the second region. The display may include at least one curved region extending from one or both of the first region or the second region to an edge of the first housing or an edge of the second housing, respectively. The curved region is disposed to be spaced apart from a side bezel structure of the first housing or the second housing, respectively, when the display is viewed.

Advantageous Effects

According to embodiments of the disclosure, a curved surface region is included at a partial edge of a display except for a folding region of the display, thereby reducing the introduction of foreign substances through a gap between the display and a housing of an electronic device.

According to embodiments of the disclosure, when the display is viewed in a flat state (e.g., unfolded or open), the thickness of the side bezel structure may be reduced, thereby improving the aesthetics of the electronic device.

Additionally, a variety of effects directly or indirectly understood through the specification may be provided.

DESCRIPTION OF DRAWINGS

With regard to description of drawings, the same or similar components will be marked by the same or similar reference signs.

MODE FOR INVENTION

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1A:
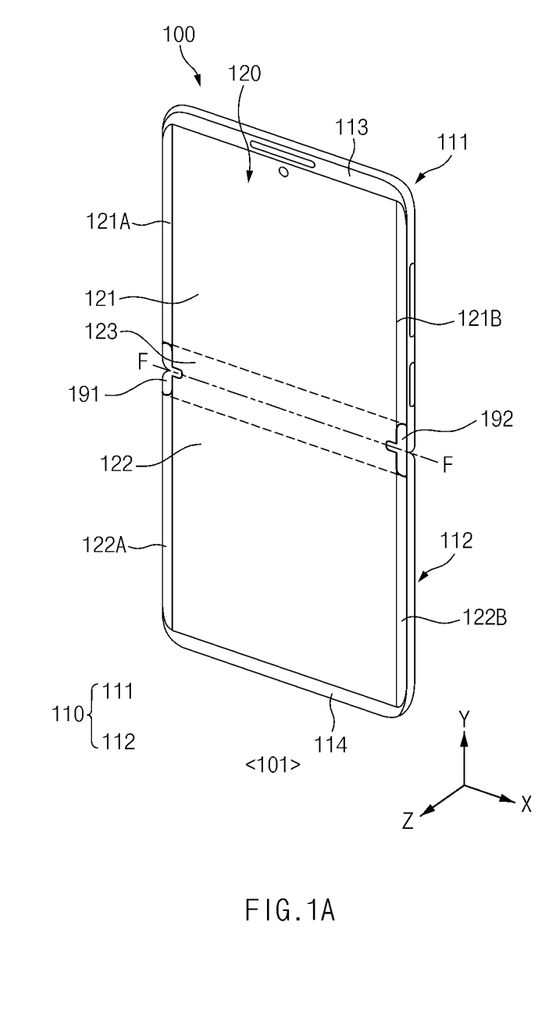
FIG. 1A is a front view illustrating an electronic device in a flat state, according to an embodiment.
Figure 1B:
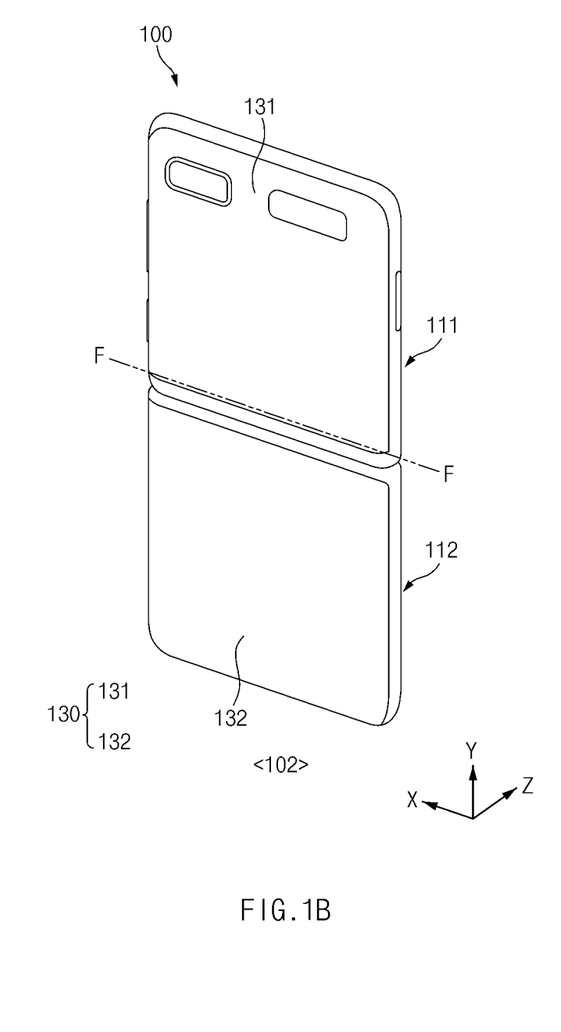
FIG. 1B is a rear view of the electronic device of FIG. 1A in the flat state.
Figure 2A:
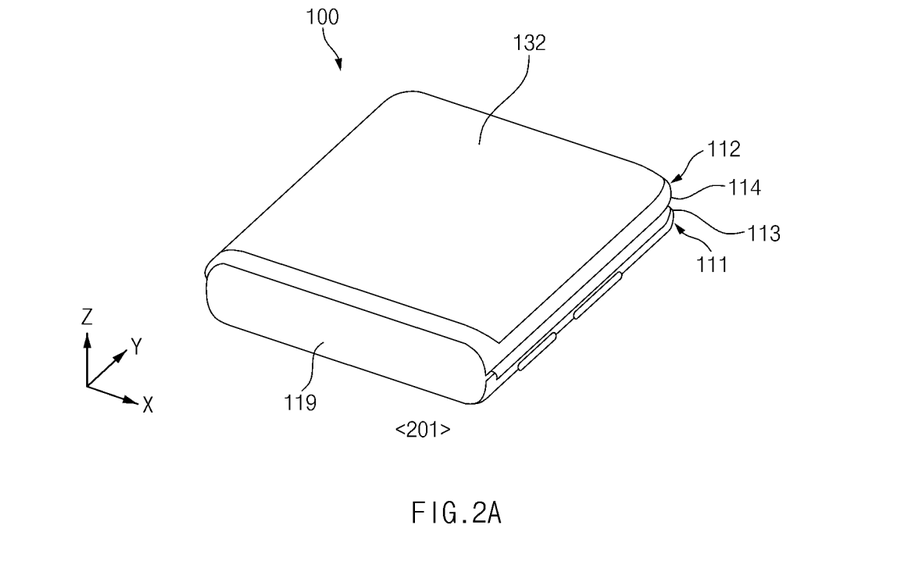
FIG. 2A is a first side view an electronic device in a folded state, according to an embodiment.
Figure 2B:
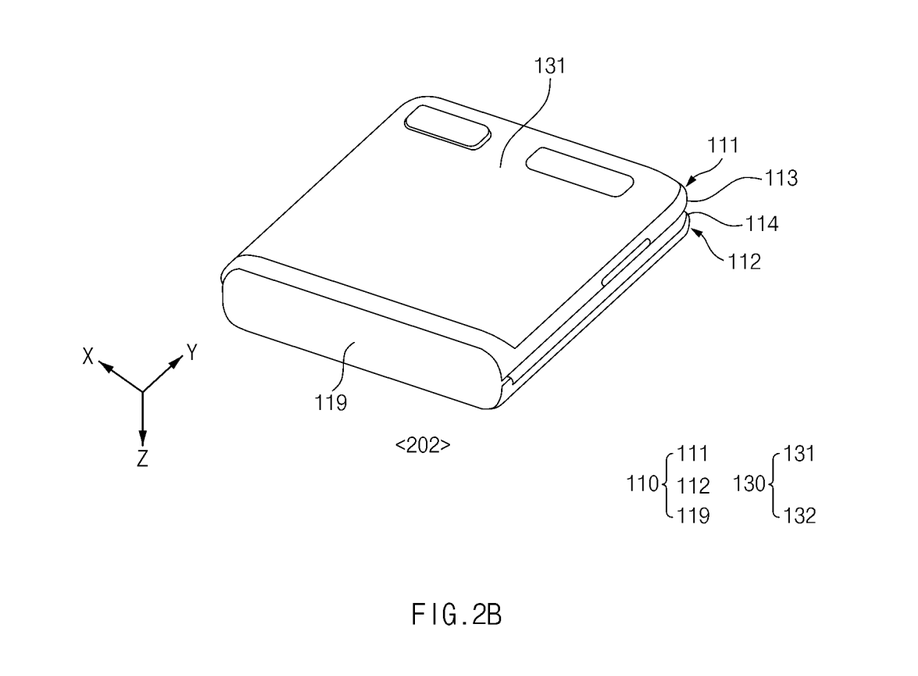
FIG. 2B is a second side view, opposite the first side view, of the electronic device of FIG. 2A in the folded state.
Figure 3:
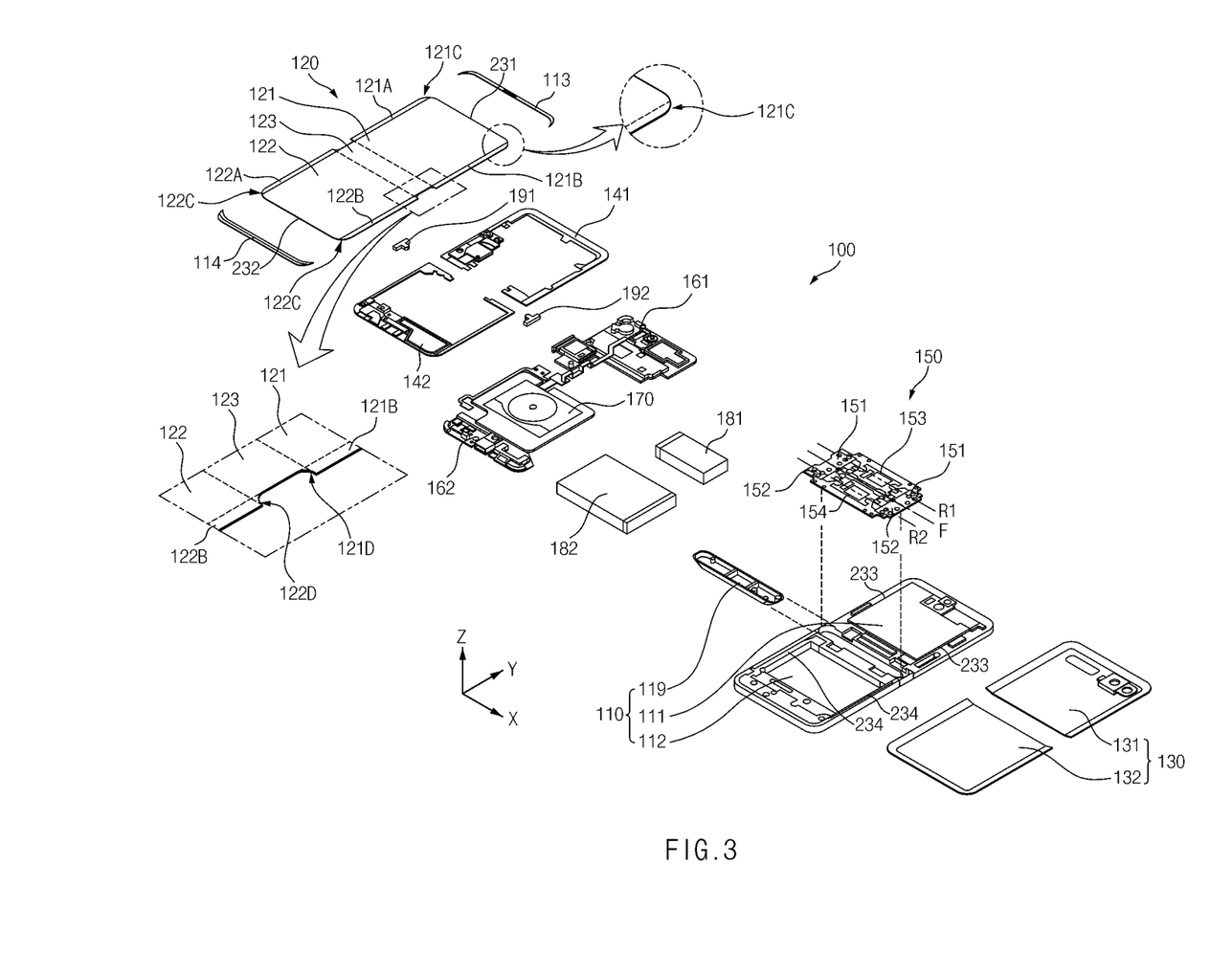
FIG. 3 is an exploded perspective view of an electronic device, according to an embodiment.
Figure 4A:
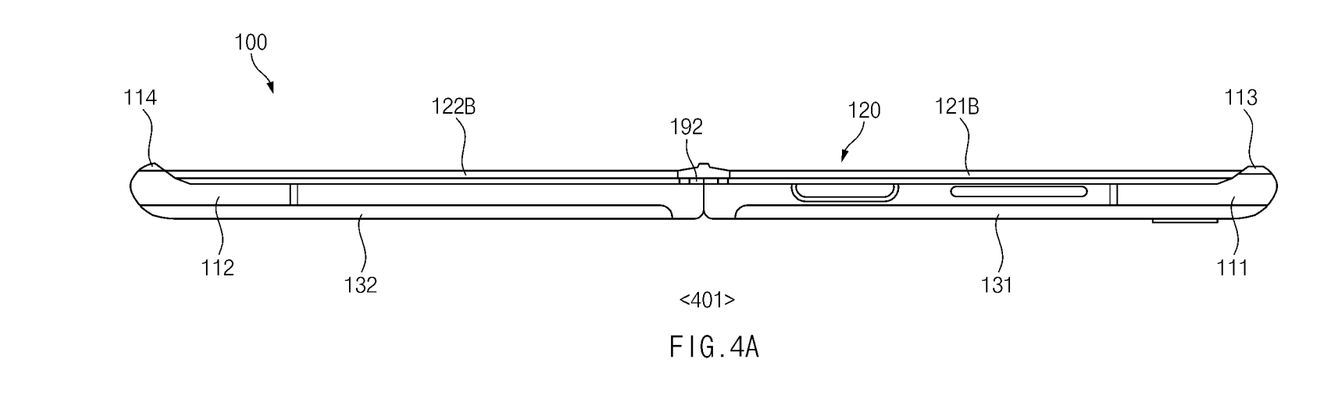
FIG. 4A is a side view of an electronic device, according to an embodiment, in a flat state.

FIGS. 1A-1B are views illustrating an electronic device in a flat state, according to an embodiment. FIGS. 2A-2B are views of an electronic device in a folded state, according to an embodiment. FIG. 3 is an exploded perspective view of an electronic device, according to an embodiment. FIG. 4A is a side view of an electronic device, according to an embodiment in a flat state and FIG. 4B is a side view of the electronic device in a folded state.

Figure 4B:
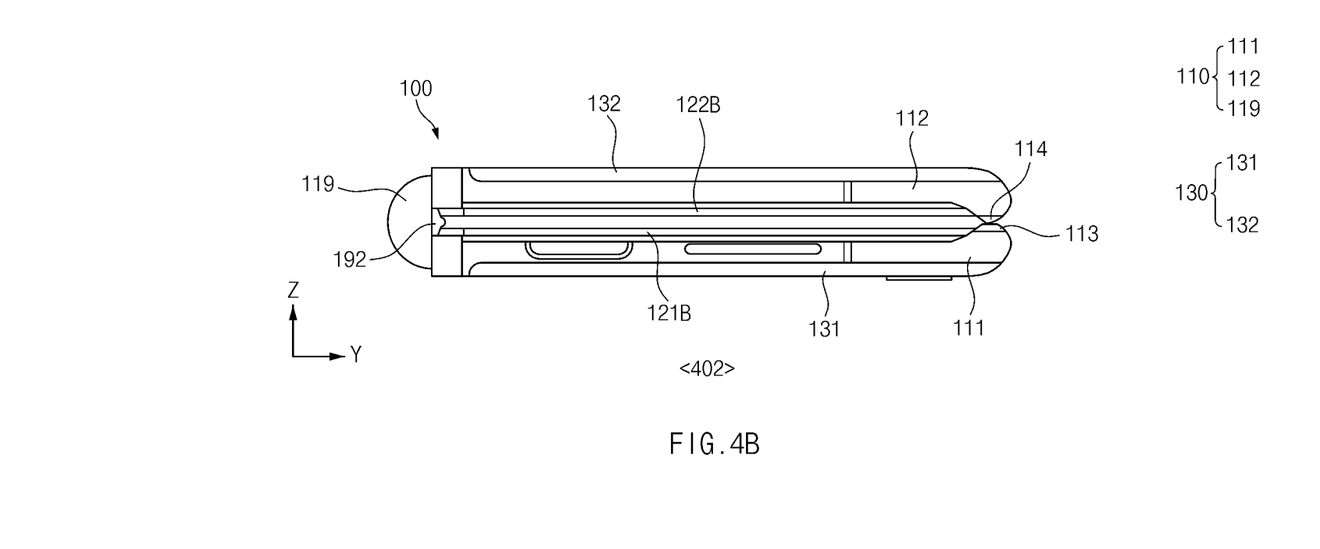
FIG. 4B is a side view of the electronic device of FIG. 4A, in a folded state.

Referring to FIGS. 1A-4B, reference numeral 101 of FIG. 1A illustrates a perspective view of an electronic device 100 viewed in one direction (e.g., a direction facing a display 120 of the electronic device 100) when the electronic device 100 (or the foldable electronic device) is in a flat state. Reference numeral 102 of FIG. 1B illustrates a perspective view of the electronic device 100 viewed in another direction (e.g., a direction facing a cover 130 of the electronic device 100) when the electronic device 100 is in the flat state. Reference numeral 201 of FIG. 2A illustrates a perspective view of the electronic device 100 viewed in still another direction (e.g., a direction facing a second cover 132 of the electronic device 100) when the electronic device 100 is in a folded state. Reference numeral 202 of FIG. 2B illustrates a perspective view of the electronic device 100 viewed in still yet another direction (e.g., a direction facing a first cover 131 of the electronic device 100) when the electronic device 100 is in the folded state. Reference numeral 401 of FIG. 4A is a side view of the electronic device 100 viewed from one side when the electronic device 100 is in the flat state. Reference numeral 402 of FIG. 4B is a side view of the electronic device 100 viewed from one side when the electronic device 100 is in the folded state. The electronic device 100 may include a foldable housing 110 (or a foldable housing structure), a display 120 (e.g., a flexible display), a cover 130, and a hinge structure 150.

According to an embodiment, the foldable housing 110 may include a first housing 111, a second housing 112, and a hinge housing 119. In a flat state (e.g., FIGS. 1A-1B), the first housing 111 and the second housing 112 may be arranged in parallel to each other. Stated another way, in the flat state, the first housing 111 and the second housing 112 may include surfaces that define a common plane. In contrast, when the electronic device 100 is in the folded state (e.g., FIGS. 2A-2B), the first housing 111 and the second housing 112 may be disposed such that one surface of the first housing 111 and one surface of the second housing 112 face each other. The first housing 111 and the second housing 112 may be rotated about a folding axis F (FIGS. 1A-1B). In the flat state, the hinge housing 119 may be received in one or both of the first housing 111 and the second housing 112. In the folded state, the hinge housing 119 may be exposed to the outside.

According to one embodiment, at least a part of the first housing 111 and the second housing 112 may be at least partially formed of a metal material. In other embodiments, the first housing 111 and the second housing 112 may be at least partially formed of a non-metal material. In some embodiments, the first housing 111 and the second housing 112 may be formed of a material having a specific stiffness to support at least a portion of the display 120.

According to an embodiment, the first housing 111 and the second housing 112 may have respective spaces or cavities for disposing electronic parts of the electronic device 100 and may form a side surface (or a side frame) of the electronic device 100. The electronic parts arranged within the first housing 111 and/or the second housing 112 may include, without limitation, printed circuit boards 161 and 162, an antenna 170, batteries 181 and 182, and a processor. It will be appreciated that various types of components for performing various functions of the electronic device 100 may be disposed inside the first housing 111 and/or the second housing 112. For example, electronic components, such as a front camera, a receiver, and a sensor (e.g., a proximity sensor) may be disposed inside the first housing 111 and/or the second housing 112. Although not illustrated in the drawings, the above-described electronic components may be visually exposed to the front surface (e.g., in the Z-axis direction) of the electronic device 100 through at least one opening or recess provided on the display 120.

According to an embodiment, the display 120 may be configured as or comprise a flexible display. The display 120 may be disposed throughout or across, and be supported by, the first housing 111, the hinge housing 119, and the second housing 112. The display 120 may include a first region 121 corresponding to at least one region of the first housing 111, a second region 122 corresponding to at least one region of the second housing 112, and a folding region 123 positioned between the first region 121 and the second region 122. In some configurations, the display 120 may form or define one surface of the first housing 111 and the second housing 112.

According to an embodiment, the display 120 may form a plane (flat state) or be bent (folded state) depending on the arrangement states of the first housing 111 and the second housing 112. For example, in the flat state, the first region 121, the folding region 123, and the second region 122 may be arranged side by side in the same direction (e.g., the Z-axis direction, or define a surface in the X-Y plane). In the folded state, the folding region 123 may be bent such that the first region 121 and the second region 122 may face each other (e.g., stacked in the Z-axis direction).

According to an embodiment, the display 120 may at least partially include a curved part. For example, the display 120 may include a first curved region 121A and a second curved region 121B bent from the first region 121 toward the first housing 111 while seamlessly extending from the first region 121. For example, the first curved region 121A and the second curved region 121B may be included at opposite edges of the first region 121. In some embodiments, and as illustrated, the display 120 may include a third curved region 122A and a fourth curved region 122B bent from the second region 122 toward the second housing 112 while seamlessly extending from the second region 122. For example, the third curved region 122A and the fourth curved region 122B may be included at opposite edges of the second region 122.

According to an embodiment, the first curved region 121A may extend from the first region 121 toward an edge (or a third edge 233) of the first housing 111. According to an embodiment, the second curved region 121B may extend from the first region 121 toward an edge (or the third edge 233) of the first housing 111 opposite to the first curved region 121A. According to an embodiment, the third curved region 122A may extend from the second region 122 toward an edge (or a fourth edge 234) of the second housing 112. According to an embodiment, the fourth curved region 122B may extend from the second region 122 toward an edge (or the fourth edge 234) of the second housing 112 opposite to the third curved region 122A.

According to an embodiment, when viewed from the side surface (e.g., an X-axis direction, a −X-axis direction, a Y-axis direction, or a −Y axis direction) of the electronic device 100, the first housing 111 or the second housing 112 may have a first thickness (or a width) at a side of the side surface (e.g., the side surface for disposing a first decorating member 113 or a second decorating member 114, the Y-axis direction or the −Y-axis direction), which does not include the curved regions 121A, 121B, 122A, and 122B, and a second thickness thinner than the first thickness at a side of the side surface (e.g., the side surface having no decorating member, the X-axis direction or the −X-axis direction) including the curved regions 121A, 121B, 122A, and 122B.

According to an embodiment, a distal end of at least one of the curved regions 121A, 121B, 122A, and 122B may be formed in a curved shape (or a curved-line shape). For example, the display 120 may include a plurality of layers. When the electronic device 100 is switched from the flat state to the folding state, a slip phenomenon may occur to push the plurality of layers of the display 120, by mutually different lengths, in a direction away from the folding axis F. In this case, the slip phenomenon may occur in portions of the first region 121 and the second region 122 which make direct contact with the folding region 123, but may not occur in the curved regions 121A, 121B, 122A, and 122B which do not make direct contact with the folding region 123. Accordingly, to reduce the stress caused at the boundary between a portion having the slip phenomenon and a portion having no slip phenomenon, a first bent part 121C, a second bent part 121D, a third bent part 122C, and a fourth bent part 122D may be formed at distal ends of the curved regions 121A, 121B, 122A, and 122B, respectively.

According to an embodiment, the cover 130 may be positioned at a lower portion of the first housing 111 and the second housing 112 (e.g., a surface opposite to the surface for the display 120), and may form a rear surface of the electronic device 100 (e.g., in the −Z axis direction in the flat state). In accordance with some embodiments, the cover 130 may include a first cover 131 coupled to the first housing 111 and a second cover 132 coupled to the second housing 112. In other non-limiting embodiments, the first cover 131 and the first housing 111 may be integrally formed, and the second cover 132 and the second housing 112 may be integrally formed.

According to an embodiment, the first housing 111 may include a first support member 141. The first support member 141 may be coupled to the first housing 111. A first printed circuit board 161 and/or a first battery 181 may be interposed between the first support member 141 and the first housing 111. A portion of the display 120 may be disposed on the first support member 141. For example, the first region 121 may be attached to the first support member 141. The second housing 112 may include a second support member 142. The second support member 142 may be coupled to the second housing 112. A second printed circuit board 162 and/or a second battery 182 may be interposed between the second support member 142 and the second housing 112. Further, another portion of the display 120 may be disposed on the second support member 142. For example, the second region 122 may be attached to the second support member 142.

According to an embodiment, the hinge structure 150 may be coupled to at least a portion of each of the first housing 111 and the second housing 112, such that the first housing 111 and the second housing 112 are folded or unfolded about the folding axis F. The hinge structure 150 may be at least partially disposed inside the hinge housing 119.

According to an embodiment, the hinge structure 150 may include a first rotating axis R1, a second rotating axis R2, a first rotating part 151, and a second rotating part 152. In accordance with embodiments, the first rotating part 151 may be configured to rotate about the first rotating axis R1. The first rotating part 151 may be coupled to the first housing 111. For example, the first rotating part 151 may be riveted, fastened, bonded, or otherwise secured to a portion of the first housing 111. In accordance with embodiments, the second rotating part 152 may be configured to rotate about the second rotating axis R2. The second rotating part 152 may be coupled to the second housing 112. For example, the second rotating part 152 may be riveted, fastened, bonded, or otherwise secured to a portion the second housing 112. The first rotating axis R1 and the second rotating axis R2 may be positioned to be substantially symmetrical to each other about the folding axis F. Accordingly, when the electronic device 100 is folded or unfolded, the first housing 111 may rotate at a specific angle about the first rotating axis R1 together with the first rotating part 131, and the second housing 112 may rotate at a specific angle about the second rotating axis R2 together with the second rotating part 152. In addition, as the first housing 111 and the second housing 112 rotate about the first rotating axis R1 and the second rotating axis R2, respectively, the first housing 111 and the second housing 112 may make contact with each other about the folding axis F.

According to an embodiment, the hinge structure 150 may further include a first support part 153 and a second support part 154 configured to support rear surfaces of the display 120. For example, the first support part 153 may at least partially support a rear surface of the first region 121 of the display 120 and the second support part 154 may at least partially support a rear surface of the second region 122 of the display 120.

According to an embodiment, the electronic device 100 may include a first decorating member 113 (or a first decorating component). For example, the first decorating member 113 may be disposed at an edge (or a first edge 231) of the first region 121, which faces in a direction opposite to the edge of the folding region 123, of edges of the first region 121. When the display 120 is viewed from the front (e.g., in the Z-axis direction), the first decorating member 113 may be at least partially overlapped with the first edge 231 of the first region 121. For example, the first edge may include an upper edge or a flat edge 231 of the first region 121. In some embodiments, the first decorating member 113 may be integrally formed with the first housing 111. In other embodiments, the first decorating member 113 may be detachably coupled to the first housing 111. The first decorating member 113 may extend from the first housing 111 to partially cover a surface of the first region 121.

According to an embodiment, the electronic device 100 may include a second decorating member 114 (or a second decorating component). For example, the second decorating member 114 may be disposed at an edge (or a second edge 232) of the second region 122, which faces in a direction opposite to the edge adjacent the folding region 123, of edges of the second region 122. When the display 120 is viewed from the front (e.g., in the Z-axis direction), the second decorating member 114 may be at least partially overlapped with the second edge 232 of the second region 122. For example, the second edge 232 may include a lower edge or a flat edge of the second region 122. In some embodiments, the second decorating member 114 may be integrally formed with the second housing 112. In other embodiments, the second decorating member 114 may be detachably coupled to the second housing 112. The second decorating member 114 may extend from the second housing 112 to partially cover a surface of the second region 122.

According to an embodiment, in the flat state (e.g., reference numeral 401 in FIG. 4A), the first decorating member 113 and the second decorating member 114 may be disposed to protrude in a direction (e.g., the Z-axis direction) of outputting an image on the display 120 rather than a direction of a plane of the display 120. In the folded state (e.g., see reference numeral 402 of FIG. 4B), the first decorating member 113 and the second decorating member 114 may make contact with each other. In the folded state, as the first decorating member 113 makes contact with the second decorating member 114, the first region 121 and the second region 122 of the display 120 may be spaced apart from each other while facing each other. That is, the first region 121 and the second region 122 will not contact each other in the folded state. Stated another way, in the folded state, a gap (in the Z-direction) is present between surfaces of the first region 121 and the second region 122. Accordingly, breakage of or damage to the display 120 may be reduced.

According to an embodiment, the electronic device 100 may include a first protecting structure 191 and a second protecting structure 192. In accordance with some embodiments, the first protecting structure 191 may be interposed between the first curved region 121A and the third curved region 122A of the display 120. Similarly, the second protecting structure 192 may be interposed between the second curved region 121B and the fourth curved region 122B of the display 120. The first protecting structure 191 and the second protecting structure 192 may reduce an external impact applied to the side surface of the folding region 123. The first protecting structure 191 and the second protecting structure 192 may reduce the inflow of foreign substances through the side surface of the folding region 123.

Figure 5A:
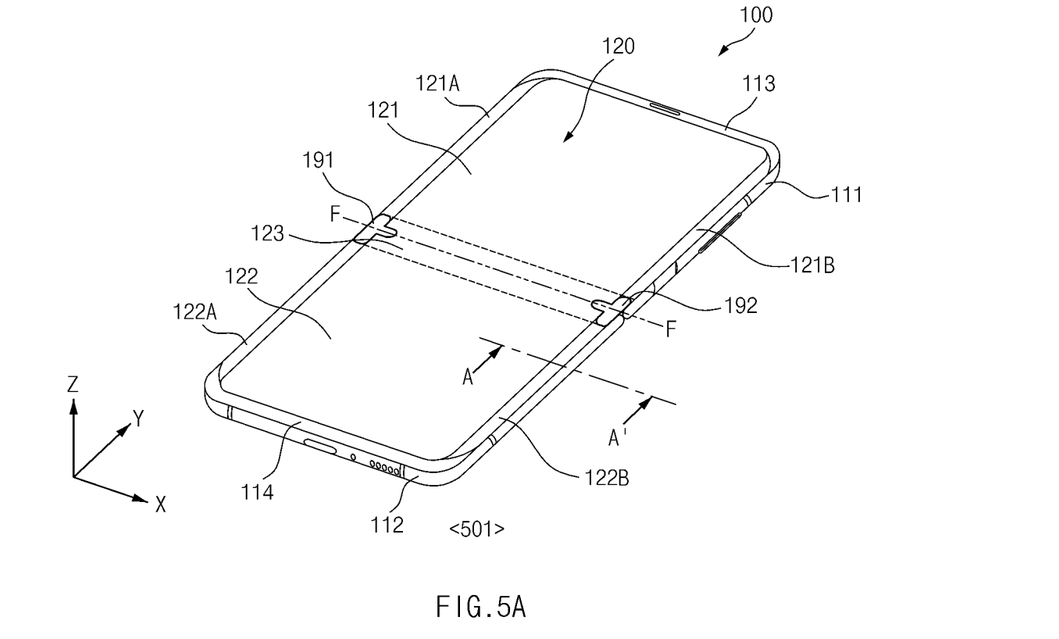
FIG. 5A is perspective view of an electronic device according to an embodiment, shown in a flat state.
Figure 5B:
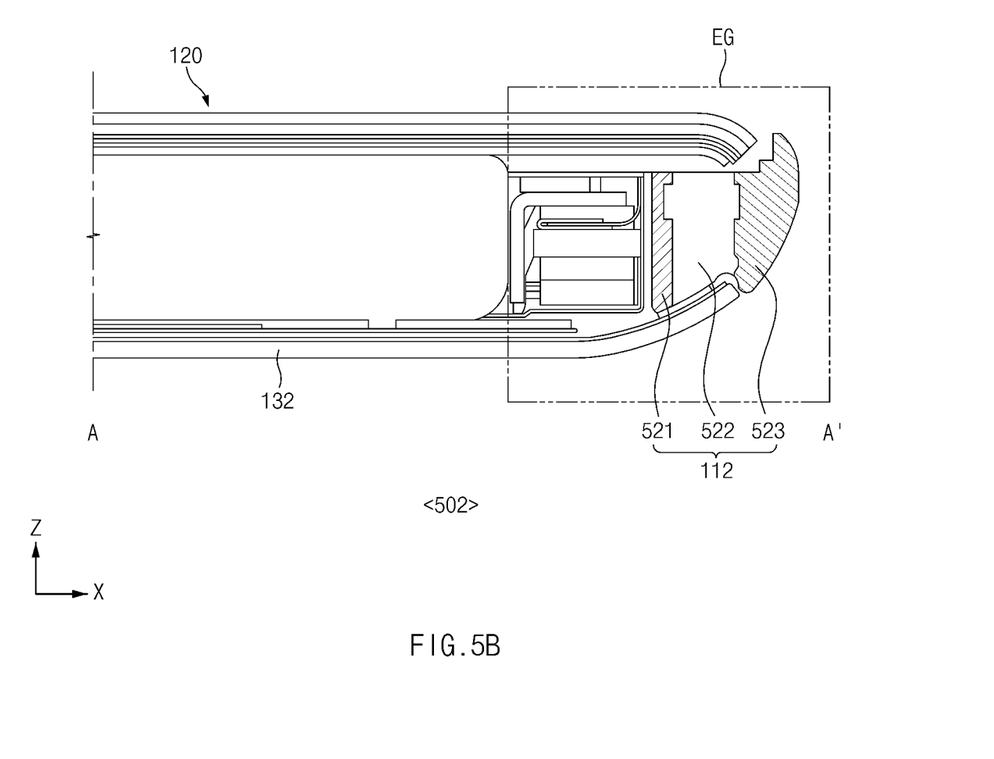
FIG. 5B is a cross-sectional view of the electronic device of FIG. 5A, taken along line A-A' of one side surface thereof.
Figure 6:
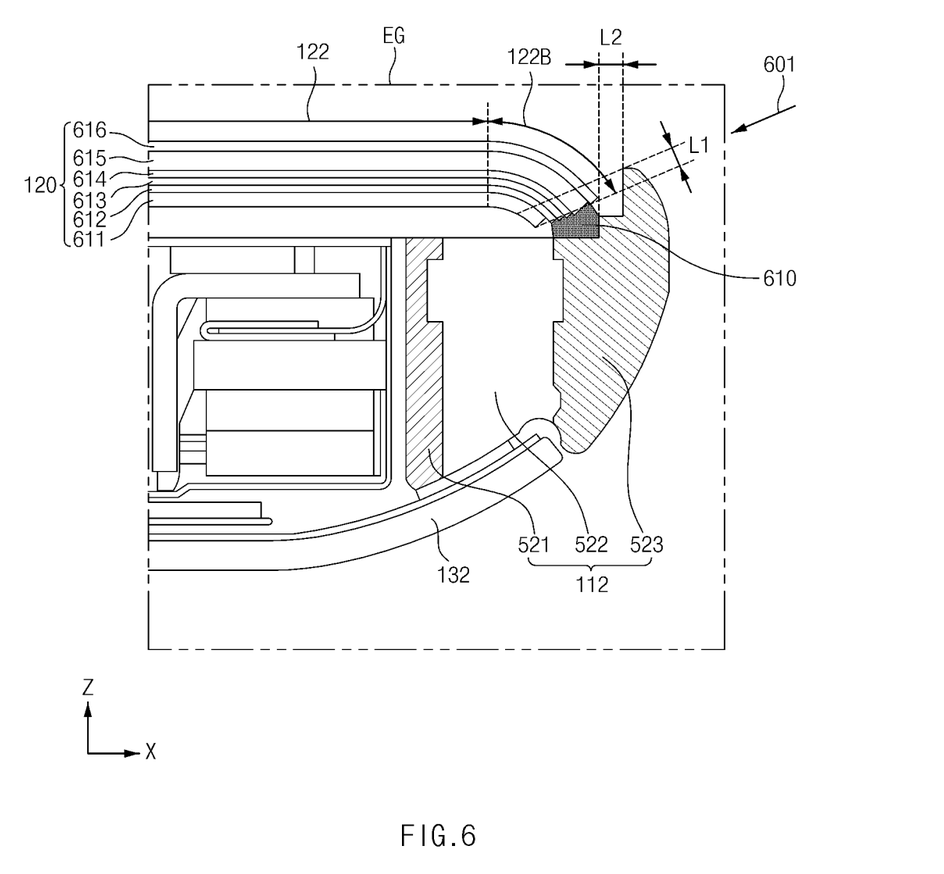
FIG. 6 is a view illustrating an example of a portion of the cross-section of FIG. 5B.
Figure 7:
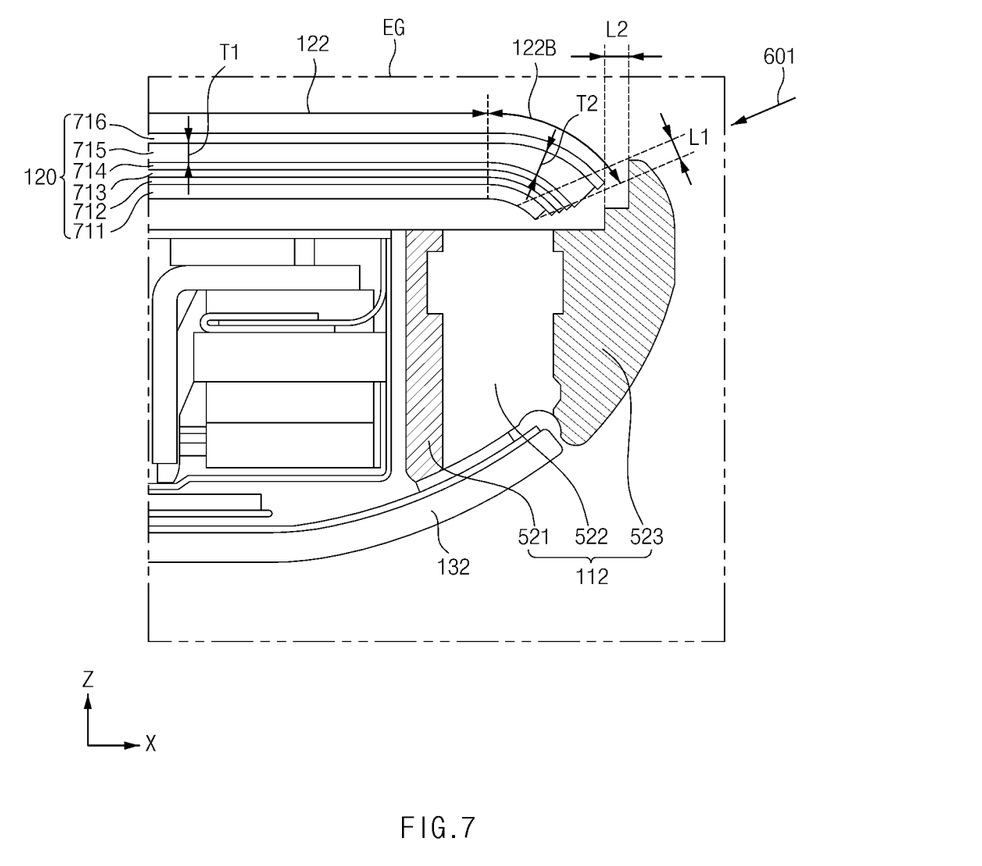
FIG. 7 is a diagram illustrating another example of a portion of the cross-section of FIG. 5B.

FIG. 5A is a perspective illustration of an electronic device in a flat state and FIG. 5B is a cross-sectional view taken along line A-A' of one side surface of the electronic device, according to an embodiment. FIG. 6 is a view illustrating an example of a portion of the cross-section of FIG. 5B. FIG. 7 is a diagram illustrating another example of a portion of the cross-section of FIG. 5B.

Referring to FIGS. 5A-7, at least one edge of a portion (e.g., the first region 121 or the second region 122) of the display 120 except for the folding region 123 may have the shape of a curved surface. For example, the display 120 may include the first curved region 121A, the second curved region 121B, the third curved region 122A, and/or the fourth curved region 122B. Although FIGS. 5B, 6, and 7 illustrate cross-sections corresponding to the fourth curved region 122B taken along line A-A' of FIG. 5A, the features described with reference to FIGS. 5B, 6, and 7 may be applicable to the first curved region 121A, the second curved region 121B, and/or the third curved region 122A. According to an embodiment, the fourth curved region 121A may be bent while seamlessly extending from the second region 122 toward the second housing 112. The second housing 112 may include a first sub-housing 521 (e.g., a first part), a second sub-housing 522 (e.g., a second part), and a third sub-housing 523 (e.g., a side bezel structure). In accordance with some embodiments, the first sub-housing 521 may be formed of a conductive member (e.g., a metal), an injection member, or a combination thereof. In some embodiments, the second sub-housing 522 may be formed of an injection member. In some embodiments, the third sub-housing 523 may be formed of a conductive member. In some configurations, the conductive member included in the first sub-housing 521 may be connected to at least a portion of the third sub-housing 523. According to various embodiments, the third sub-housing 523 may be included in and/or form a part of at least one antenna of the electronic device 100. For example, the third sub-housing 523, serving as an antenna radiator, may be electrically connected to a communication module (e.g., the communication module 890 of FIG. 8) included in the first housing 111 or the second housing 112.

According to an embodiment, the display 120 of the electronic device 100 may include a plurality of layers, as shown in FIGS. 6-7. For example, referring to FIGS. 6-7, the display 120 may include a support plate 611 or 711 (e.g., a special use steel (SUS)), an impact absorbing layer 612 or 712, a display panel 613 or 713, a polarizing plate 614 or 714, a glass layer 615 or 715 (e.g., ultra-thin glass (UTG)), and/or a protective layer 616 or 716. In accordance with some embodiments, and as illustrated, the impact absorbing layer 612 or 712 may be stacked on the support plate 611 or 711. Furthermore, the display panel 613 or 713 may be stacked on the impact absorbing layer 612 or 712. Further, the polarizing plate 614 or 714 may be stacked on the display panel 613 or 713. Further, the glass layer 615 or 715 may be stacked on the polarizing plate 614 or 714. Further, the protective layer 616 or 716 may be stacked on the glass layer 615 or 715. It will be appreciated that each of the plurality of layers may be attached to each other through a transparent adhesive member (e.g., an adhesive tape or an adhesive) or otherwise connected or bonded together, as will be appreciated by those of skill in the art.

According to an embodiment, a plurality of layers of the display 120 may have mutually different lengths in a direction parallel to the folding axis F (e.g., an X-axis direction). For example, each of the plurality of layers may have a length reduced in a direction parallel to the folding axis F, toward an inner part of the electronic device 100. For example, the impact absorbing layer 612 or 712 may be formed to be longer than the support plate 611 or 711. The display panel 613 or 713 may be formed longer than the impact absorbing layer 612 or 712. The polarizing plate 614 or 714 may be formed to be longer than the display panel 613 or 713. The glass layer 615 or 715 may be formed to be longer than the polarizing plate 614 or 714. The protective layer 616 or 716 may be formed to be longer than the glass layer 615 or 715.

According to an embodiment, the fourth curved region 122B may be overlapped with the third sub-housing 523 by a first size L1 (e.g., 0.2 mm) or more, when viewed in a specified direction 601 (e.g., a direction perpendicular to the cross-section of the corner of the display 120). Accordingly, the inflow of foreign substances may be reduced between the edge of the fourth curved region 122B and the third sub-housing 523. According to an embodiment, when the electronic device 100 is in the flat state and viewed from the front (e.g., the Z-axis direction), the fourth curved region 122B may be disposed to be spaced apart from the third sub-housing 523. For example, the fourth curved region 122B may be disposed to have a gap, which is less than or equal to a second size L2 (e.g., 0.2 mm), from the third sub-housing 523. Accordingly, when manufacturing the electronic device 100, the display 120 may be coupled to the first housing 111 and the second housing 112 at the final stage. In accordance with some embodiments, the second size L2 may be set to be different from the first size L1. In other embodiments, the second size L2 may be set to be equal to the first size L1.

According to an embodiment, one or more sealing members 610 may be interposed between the fourth curved region 122B and the second housing 112. For example, the sealing members (e.g., rubber, silicone, acrylic, and/or polyurethane) 610 may be interposed between the fourth curved region 122B and the third sub-housing 523. The sealing members 610 may provide additional sealing to prevent introduction of foreign substances.

According to an embodiment, as illustrated in FIG. 7, the glass layer 715 may have different thicknesses in the second region 122 and the fourth curved region 122B. For example, the glass layer 715 may have a first thickness T1 in the second region 122 and a second thickness T2 thicker than the first thickness T1 in the fourth curved region 122B. Accordingly, the glass layer 715 may apply a specific pressure toward the second housing 112 in the fourth curved region 122B, and the glass layer 715 may reduce the de-lamination of the impact absorbing layer 712, the display panel 713, and/or the polarizing plate 714.

Figure 8:
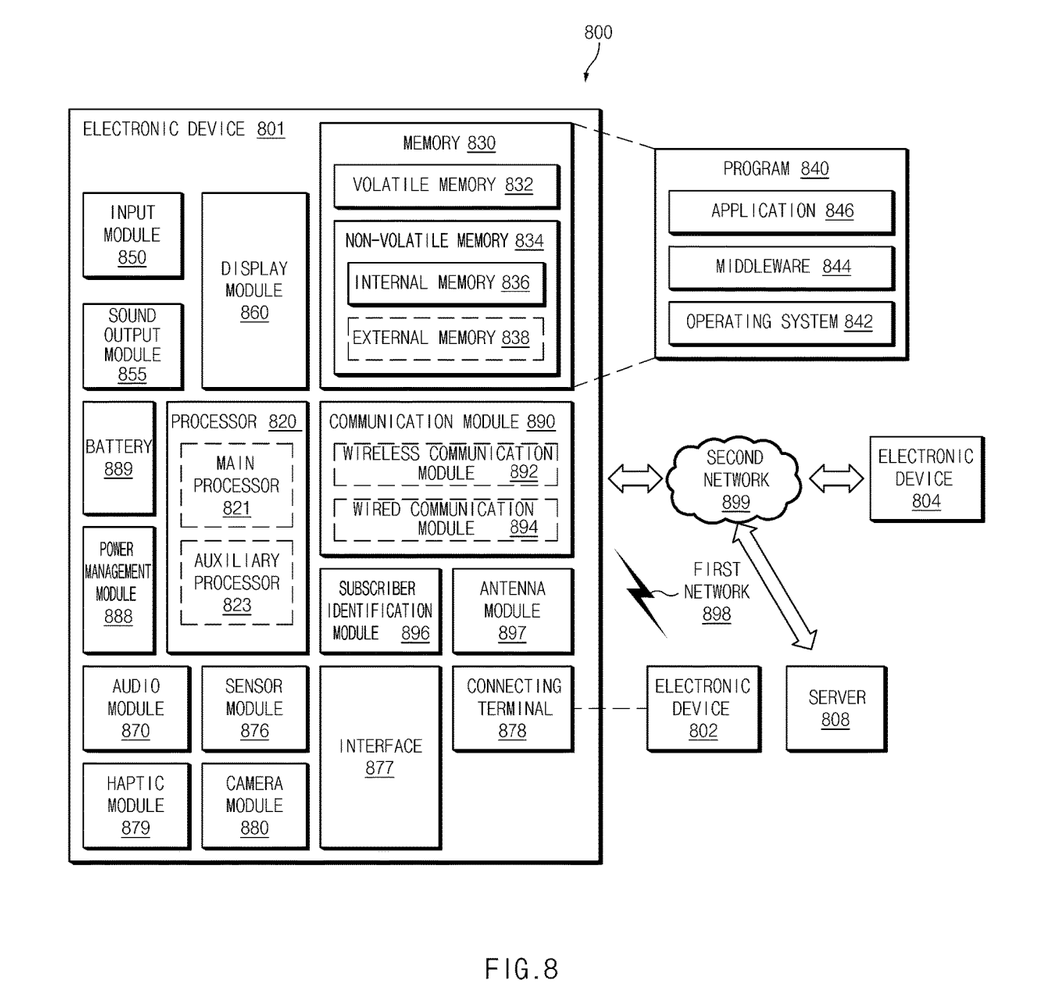
FIG. 8 is a block diagram illustrating an electronic device in a network environment according to various embodiments.

FIG. 8 is a block diagram illustrating an electronic device 801 in a network environment 800 according to various embodiments. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input module 850, a sound output module 855, a display module 860, an audio module 870, a sensor module 876, an interface 877, a connecting terminal 878, a haptic module 879, a camera module 880, a power management module 888, a battery 889, a communication module 890, a subscriber identification module (SIM) 196, or an antenna module 897. In some embodiments, at least one of the components (e.g., the connecting terminal 878) may be omitted from the electronic device 801, or one or more other components may be added in the electronic device 801. In some embodiments, some of the components (e.g., the sensor module 876, the camera module 880, or the antenna module 897) may be implemented as a single component (e.g., the display module 860).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may store a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), or an auxiliary processor 823 (e.g., a graphics processing unit (GPU), a neural processing unit (NPU), an image signal processor (ISP), a sensor hub processor, or a communication processor (CP)) that is operable independently from, or in conjunction with, the main processor 821. For example, when the electronic device 801 includes the main processor 821 and the auxiliary processor 823, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display module 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823. According to an embodiment, the auxiliary processor 823 (e.g., the neural processing unit) may include a hardware structure specified for artificial intelligence model processing. An artificial intelligence model may be generated by machine learning. Such learning may be performed, e.g., by the electronic device 801 where the artificial intelligence is performed or via a separate server (e.g., the server 808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input module 850 may receive a command or data to be used by another component (e.g., the processor 820) of the electronic device 801, from the outside (e.g., a user) of the electronic device 801. The input module 850 may include, for example, a microphone, a mouse, a keyboard, a key (e.g., a button), or a digital pen (e.g., a stylus pen).

The sound output module 855 may output sound signals to the outside of the electronic device 801. The sound output module 855 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 860 may visually provide information to the outside (e.g., a user) of the electronic device 801. The display module 860 may include, for example, a display, a hologram device, or a projector and control circuitry to control a corresponding one of the display, hologram device, and projector. According to an embodiment, the display module 860 may include a touch sensor adapted to detect a touch, or a pressure sensor adapted to measure the intensity of force incurred by the touch.

The audio module 870 may convert a sound into an electrical signal and vice versa. According to an embodiment, the audio module 870 may obtain the sound via the input module 850, or output the sound via the sound output module 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector).

The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The wireless communication module 892 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 892 may support a high-frequency band (e.g., the mmWave band) to achieve, e.g., a high data transmission rate. The wireless communication module 892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 892 may support various requirements specified in the electronic device 801, an external electronic device (e.g., the electronic device 804), or a network system (e.g., the second network 899). According to an embodiment, the wireless communication module 892 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 897 may transmit or receive a signal or power to or from the outside (e.g., the external electronic device) of the electronic device 801. According to an embodiment, the antenna module 897 may include an antenna including a radiating element composed of a conductive material or a conductive pattern formed in or on a substrate (e.g., a printed circuit board (PCB)). According to an embodiment, the antenna module 897 may include a plurality of antennas (e.g., array antennas). In such a case, at least one antenna appropriate for a communication scheme used in the communication network, such as the first network 898 or the second network 899, may be selected, for example, by the communication module 890 (e.g., the wireless communication module 892) from the plurality of antennas. The signal or the power may then be transmitted or received between the communication module 890 and the external electronic device via the selected at least one antenna. According to an embodiment, another component (e.g., a radio frequency integrated circuit (RFIC)) other than the radiating element may be additionally formed as part of the antenna module 897.

According to various embodiments, the antenna module 897 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 or 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, mobile edge computing (MEC), or client-server computing technology may be used, for example. The electronic device 801 may provide ultra low-latency services using, e.g., distributed computing or mobile edge computing. In another embodiment, the external electronic device 804 may include an internet-of-things (IoT) device. The server 808 may be an intelligent server using machine learning and/or a neural network. According to an embodiment, the external electronic device 804 or the server 808 may be included in the second network 899. The electronic device 801 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a mobile communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a first housing;
    a second housing;
    a hinge housing interposed between the first housing and the second housing;
    a display extending from the first housing to the second housing and crossing the hinge housing, the display including a first region corresponding to the first housing, a second region corresponding to the second housing, and a folding region corresponding to the hinge housing;
    a first decorating member disposed at a first edge of the first region, wherein the first edge is an edge of the first region that is opposite to an edge of the first region adjacent to the folding region; and
    a second decorating member disposed at a second edge of the second region, wherein the second edge is an edge of the second region that is opposite to an edge of the second region adjacent to the folding region,
    wherein the first housing and the second housing are configured to fold and unfold about a folding axis to define a flat state in which the first region, the folding region, and the second region are aligned in line with each other, and to define a folded state in which the first region faces the second region,
    wherein the display includes at least one curved region forms at least one edge of the first region of the second region except for the folding region,
    wherein the at least one curved region extends from the first region or the second region toward a third edge of the first housing or a fourth edge of the second housing, and
    wherein the at least one curved region is disposed to start to bend spaced apart from a side bezel structure of the first housing or the second housing, when the display is viewed from above.

2. The electronic device of claim 1, wherein the display includes a plurality of layers, and
    wherein the plurality of layers are formed to have mutually different lengths in a direction parallel to the folding axis.

3. The electronic device of claim 2, wherein the plurality of layers have lengths reduced in the direction parallel to the folding axis, toward an inner part of the electronic device.

4. The electronic device of claim 2, wherein the plurality of layers include:
    a support plate;
    an impact absorbing layer stacked on the support plate;
    a display panel stacked on the impact absorbing layer;
    a polarizing plate stacked on the display panel; and
    a glass layer stacked on the polarizing plate.

5. The electronic device of claim 4, wherein the impact absorbing layer has a length longer than a length of the support plate in the direction parallel to the folding axis.

6. The electronic device of claim 4, wherein the display panel has a length longer than a length of the impact absorbing layer in the direction parallel to the folding axis.

7. The electronic device of claim 4, wherein the polarizing plate has a length longer than a length of the display panel in the direction parallel to the folding axis.

8. The electronic device of claim 4, wherein the glass layer has a length longer than a length of the polarizing plate in the direction parallel to the folding axis.

9. The electronic device of claim 4, wherein the glass layer has a greater thickness in the at least one curved region as compared to a thickness of the glass layer in the first region or the second region.

10. The electronic device of claim 9, wherein the glass layer includes an ultra-thin glass.

11. The electronic device of claim 2, wherein each layer of the plurality of layers has a different length in a direction perpendicular to the folding axis in the first region or the second region, when the flat state is changed to the folded state.

12. The electronic device of claim 11, wherein the plurality of layers have no difference in length in the direction perpendicular to the folding axis in the curved region, when the flat state is changed to the folded state.

13. The electronic device of claim 1, wherein a distal end, which is positioned in a direction perpendicular to the folding axis, of the curved region has a shape of a curved line, when the display is viewed in the flat state.

14. The electronic device of claim 1, wherein a portion, which is coupled to the first decorating member or the second decorating member, of the side bezel structure has a first thickness, and a remaining portion of the side bezel structure has a second thickness thinner than the first thickness.

15. The electronic device of claim 1, wherein at least one of the first housing and the second housing includes:
    a first part including at least one of a first conductive member and a first injection member;
    a second part including a second injection member; and
    the side bezel structure includes a second conductive member.

16. The electronic device of claim 15, wherein the first conductive member of the first part is electrically connected to at least a portion of the side bezel structure.

17. The electronic device of claim 1, wherein the first decorating member is configured to contact with the second decorating member when the electronic device is in the folded state.

18. The electronic device of claim 17, wherein the first region and the second region are spaced apart from each other by the first decorating member and the second decorating member while facing each other, in the folded state.

19. An electronic device comprising:
    a first housing;
    a second housing;
    a hinge housing interposed between the first housing and the second housing;
    a display extending from the first housing to the second housing and crossing the hinge housing, the display including a first region corresponding to the first housing, a second region corresponding to the second housing, and a folding region corresponding to the hinge housing;

a first decorating member disposed at a first edge of the first region, wherein the first edge is an edge of the first region that is opposite to an edge of the first region adjacent to the folding region; and a second decorating member disposed at a second edge of the second region, wherein the second edge is an edge of the second region that is opposite to an edge of the second region adjacent to the folding region, wherein the first housing and the second housing are configured to fold and unfold about a folding axis to define a flat state in which the first region, the folding region, and the second region are aligned in line with each other, and to define a folded state in which the first region faces the second region, wherein the display includes at least one curved region extending from the first region or the second region toward a third edge of the first housing or a fourth edge of the second housing, wherein the at least one curved region includes:

a first curved region adjacent to the folding axis and seamlessly extending from the first region toward the third edge of the first housing;

a second curved region adjacent to the folding axis and seamlessly extending from the first region toward the third edge of the first housing opposite to the first curved region;

a third curved region adjacent to the folding axis and seamlessly extending from the second region toward the fourth edge of the second housing; and a fourth curved region adjacent to the folding axis and seamlessly extending from the second region toward the fourth edge of the second housing opposite to the third curved region, and wherein the at least one curved region is disposed to start to bend spaced apart from a side bezel structure of the first housing or the second housing, when the display is viewed from above.

20. The electronic device of claim 1, further comprising:

a sealing member interposed between the curved region and the side bezel structure.

\* \* \* \* \*